United States Patent [19]

Breeden et al.

[11] Patent Number: 5,321,735

[45] Date of Patent: Jun. 14, 1994

[54] METHOD AND APPARATUS FOR SELECTIVE REAL TIME AUTHORIZATION AND BILLING OF CALLS IN A PUBLIC TELEPOINT SYSTEM

[75] Inventors: Robert L. Breeden, Boynton Beach; Steven C. Shapiro, Lake Worth, both of Fla.

[73] Assignee: Motorola, Inc., Schaumburg, Ill.

[21] Appl. No.: 906,110

[22] Filed: Jun. 29, 1992

[51] Int. Cl.$^5$ .......................................... H04M 11/00
[52] U.S. Cl. ........................................ 379/58; 379/91; 379/112; 379/113; 379/114
[58] Field of Search .............. 379/58, 59, 91, 111–115, 379/133, 134

[56] References Cited

U.S. PATENT DOCUMENTS

| | | | |
|---|---|---|---|
| 4,831,647 | 5/1989 | D'Avello et al. | |
| 4,891,836 | 1/1990 | Takahashi | |
| 5,148,472 | 9/1992 | Freese et al. | 379/59 |
| 5,208,847 | 5/1993 | Allen | 379/59 |

FOREIGN PATENT DOCUMENTS 63-14563 1/1988 Japan.

OTHER PUBLICATIONS

"CT2 Common Air Interface", Version 1.1, published Jun. 30, 1991 by the European Telecommunications Standards Institute.

Primary Examiner—Curtis Kuntz
Assistant Examiner—Dwayne D. Bost
Attorney, Agent, or Firm—Kelly A. Gardner; Thomas G. Berry

[57] ABSTRACT

A method, in a base station providing communications within a coverage area for authorizing and processing calls initiated by portable communication units (PCUs), whereby the base station is coupled to a network control center, comprises receiving (615) registration information, including a value indicating a type of PCU, from a PCU. Further steps include determining (620), in response to receiving (615) the registration information, the PCU type indicated by the value and requesting (610), in response to determining (625) that the PCU is of a specific type, authorization from a network control center for a call initiated by the PCU. A still further step includes processing (650), if authorization is received from the network control center, the call initiated by the PCU.

18 Claims, 5 Drawing Sheets

METHOD AND APPARATUS FOR SELECTIVE REAL TIME AUTHORIZATION AND BILLING OF CALLS IN A PUBLIC TELEPOINT SYSTEM

FIELD OF THE INVENTION

This invention relates in general to wireless communication systems, and more specifically to a method and apparatus for selective real-time authorization and billing of calls in a wireless communication system.

BACKGROUND OF THE INVENTION

Two-way wireless communication systems that support calls to the public switched telephone network (PSTN) are well known in the art. Examples of such systems include cellular telephone systems and trunked radio systems. Additional known systems include citywide telepoint systems based on second generation cordless telephone (CT2) technology. This latter technology provides service within small, isolated "islands" of coverage, each defined by a limited radio coverage range provided by one or more fixed communication units, i.e., base stations, located therein. Unlike cellular telephone systems and trunked radio systems, CT2 citywide telepoint systems typically have hundreds or even thousands of base stations, each individually interconnected with the PSTN. As each call within a specific coverage range is received from portable communication units (PCUs), a base station providing coverage within the range typically authorizes the call and couples the call to the PSTN. Information about each call, such as call destination and length of the call, is thereafter periodically forwarded across the PSTN to a network control center, which usually controls the base stations providing service within a geographic area. The network control center, in response to receiving the call information from each of the base stations providing coverage within the geographic area, updates billing information corresponding to system subscribers.

The information collection process is typically performed once a day, usually at a time such as during early morning hours when the PSTN has little traffic. A telepoint service provider may thereafter provide itemized bills, perhaps monthly, to the subscribers registered on the system. In some circumstances, however, the current billing process may pose a problem if updated billing information is needed more often than the call information is collected, e.g., once a day. Such a circumstance could arise, for example, if the telepoint service provider desires to provide rental PCUs to subscribers needing only temporary portable telephone service. In this case, the telepoint system must be capable of authorizing each call made from a rental PCU to prevent the temporary subscribers from receiving service for which they have not paid. Furthermore, the telepoint service provider must be able to provide itemized billing statements to the temporary subscribers upon return of the rental PCU.

One solution to this problem would be to implement a system in which every call from every PCU within the system would be authorized by the network control center at the time of the call. This solution would further require that the base station immediately transmit the call information to the network control center at the termination of each call. In response to reception of the call information, the network control center would update the billing information for the subscriber, whether temporary or full-time. Such a solution is not feasible for use with the current telepoint system, however, because the network control center may be coupled to thousands of base stations by the PSTN, the capacity of which would, in all probability, be exceeded during peak business hours. Although the addition of dedicated telephone lines between the network control center and each base station might provide for such an excessive amount of communication, the thousands of necessary telephone lines could only be installed at great expense, the end result of which would be a substantial increase in the cost of telepoint service.

Thus, what is needed is a method for selectively authorizing calls in real time in a telepoint system. This method should, in addition to providing for the authorization of selected calls in real time, provide for the updating of billing information as each call is terminated. Furthermore, the employment of the method should prevent the overloading of the capacity of the existing PSTN during peak business hours.

SUMMARY OF THE INVENTION

A base station coupled to a network control center provides communications within a coverage area. A method in the base station for authorizing and processing calls initiated by portable communication units (PCUs) includes the steps of receiving registration information from a PCU and determining, in response to the registration information, that the PCU is a first type of PCU when the registration information includes a type value and that the PCU is a second type of PCU when the registration information does not include the type value. In response to determining that the PCU is of the first type, the call initiated by the PCU is processed when authorization from the network control center is received for the call. Call information is then automatically forwarded to the network control center in response to termination of the call. When the PCU is the second type of PCU, the call is processed without request for authorization, and call information is not forwarded to the network control center in response to termination of the call.

A base station for providing communications for a limited coverage area comprises a transceiver for transmitting radio frequency (RF) signals to an external portable communication unit (PCU) and for receiving RF signals from the PCU, the received RF signals comprising a value indicating a PCU type. Determination circuitry coupled to the transceiver determines that the PCU is of a first type or of a second type responsive to the received RF signals. Communication means coupled to the determination circuitry and the transceiver communicates with an external network control center at least once per call to authorize the call prior to processing the call when the calling PCU is of the first type, and providing means coupled to the communication means provides call information to the external network control center in response to termination of the call when the PCU is of the first type. Call information is not provided to the external network control center in response to termination of the call when the PCU is of the second type.

DESCRIPTION OF A PREFERRED EMBODIMENT

Figure 1:
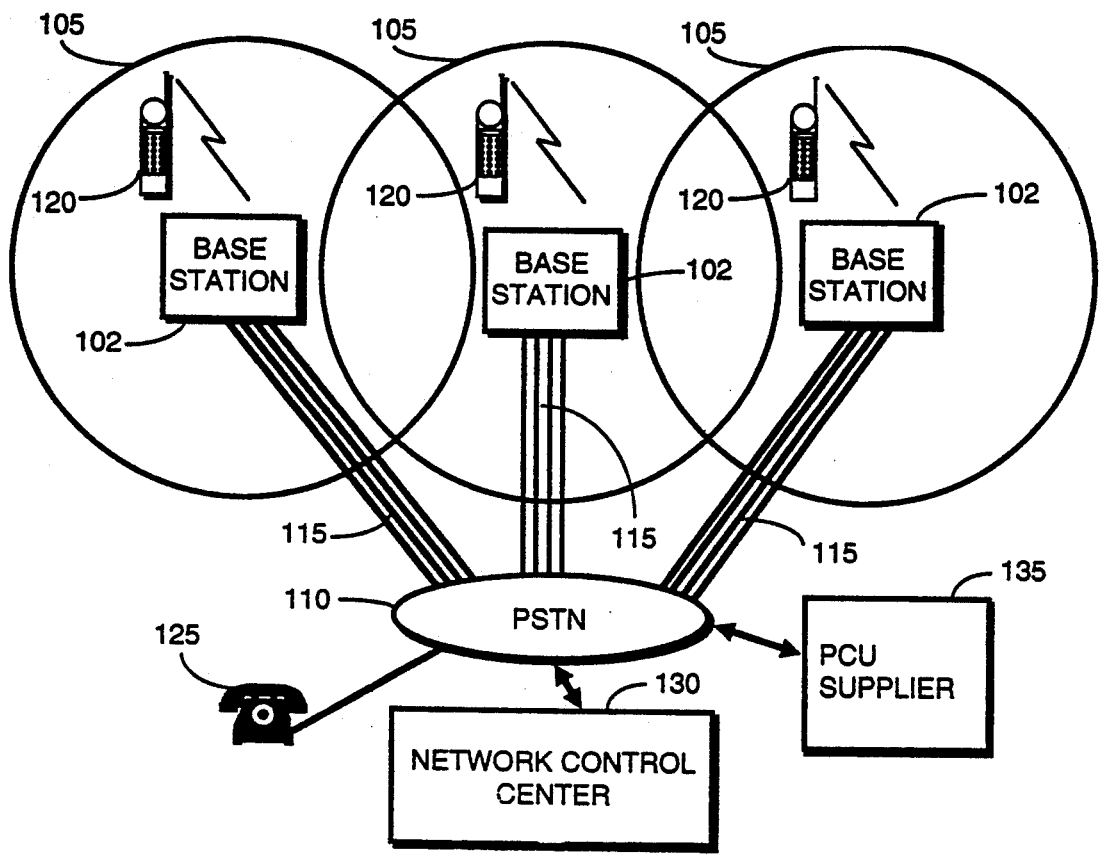
FIG. 1 is a block diagram of a wireless communication system in accordance with the preferred embodiment of the present invention.

Referring to FIG. 1, a block diagram of a wireless communication system in accordance with a preferred embodiment of the present invention is depicted. The wireless communication system comprises a plurality of fixed communication units, i.e., base stations 102, that provide radio coverage in a plurality of "islands" of coverage 105. The base stations 102 are coupled to the public switched telephone network (PSTN) 110 by a plurality of telephone lines 115 comprising both data and voice channels. Those skilled in the art will recognize that, in an alternate embodiment of the present invention, the wireless communication system may be used with a telephone system other than the PSTN 110, such as a private branch exchange.

The wireless communication system further comprises a plurality of portable communication units (PCUs) 120 and at least one conventional wired telephone set 125, wherein the PCUs 120 are able to send calls to the at least one wired telephone set 125. Further enabling the wireless communication system for calls from the PCUs 120 to the at least one wired telephone set 125 is a network control center 130. The network control center 130, in accordance with the preferred embodiment of the present invention, authorizes calls and updates billing information in response to call information selectively forwarded by the base stations 102. A PCU supplier 135 may access, at any time, the updated billing information for PCUs controlled by the PCU supplier 135.

Figure 2:
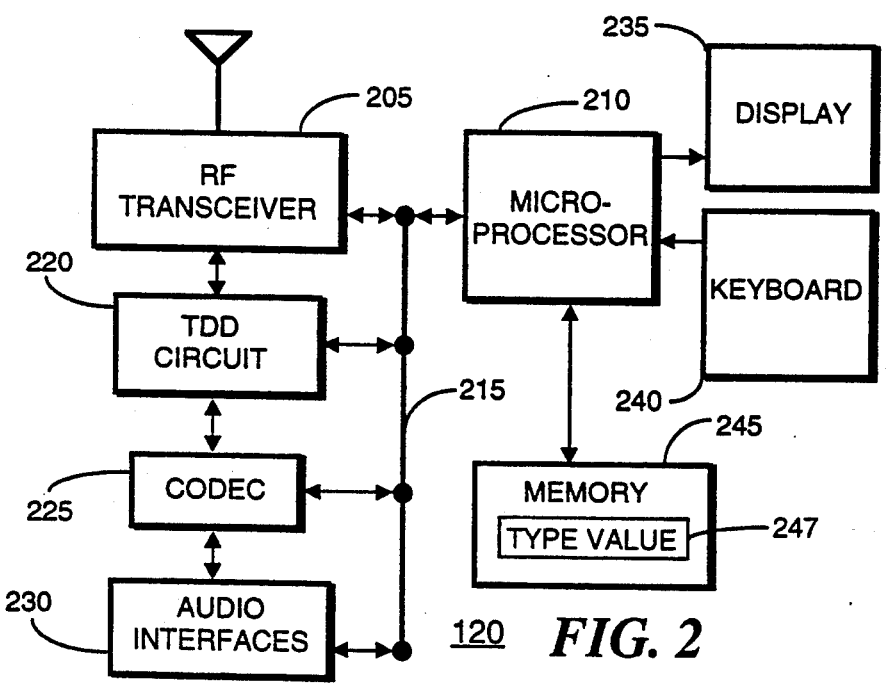
FIG. 2 is a block diagram of a portable communication unit (PCU) used with the wireless communication system of FIG. 1 in accordance with the preferred embodiment of the present invention.

With reference to FIG. 2, a block diagram depicts a PCU 120 in accordance with the preferred embodiment of the present invention. The PCU comprises a radio frequency (RF) transceiver 205 for transmitting and receiving radio signals including digital information. The RF transceiver 205 is coupled to a microprocessor 210 for controlling the RF transceiver 205 by a bus 215. Additionally, the RF transceiver 205 is coupled to a time division duplex (TDD) circuit 220 for interfacing the RF transceiver 205 to a codec 225, which performs audio-to-digital and digital-to-audio conversions of signals transmitted and received, respectively, by the PCU 120. The codec 225 is coupled to audio interfaces 230 for sending and receiving audio signals to and from a PCU user. The TDD circuit 220, the codec 225, and the audio interfaces 230 are further coupled to the bus 215, by which they are controlled by the microprocessor 210.

Also coupled to the microprocessor 210 are a display 235 for displaying information sent from the microprocessor 210 and a keyboard 240, whereby information entered by the user may be transmitted to the microprocessor 210. A memory 245 is coupled to the microprocessor 210 for storing program control software and for storing, in accordance with the preferred embodiment, a type value 247. The type value is, in accordance with the preferred embodiment of the present invention, one of at least two binary numbers assigned to represent types of PCUs. The type value 247 may be programmed into the memory 245, for example, as part of registration data entered via the keyboard 240. Preferably, the registration data is only accepted by the microprocessor 210 when it includes a PCU identification number corresponding to the PCU 120, thereby preventing the unauthorized programming of the PCU 120. Alternatively, the type value 247 could be transmitted to the PCU 120 by means of a dedicated programming port which would transfer the type value 247 to the microprocessor 210 for subsequent storage in the memory 245. Subsequent to the type value 247 being programmed into the memory 245, the PCU 120 supplies registration information, including the type value 247, to a base station 102 (FIG. 1) each time the PCU 120 initiates a call.

Figure 3:
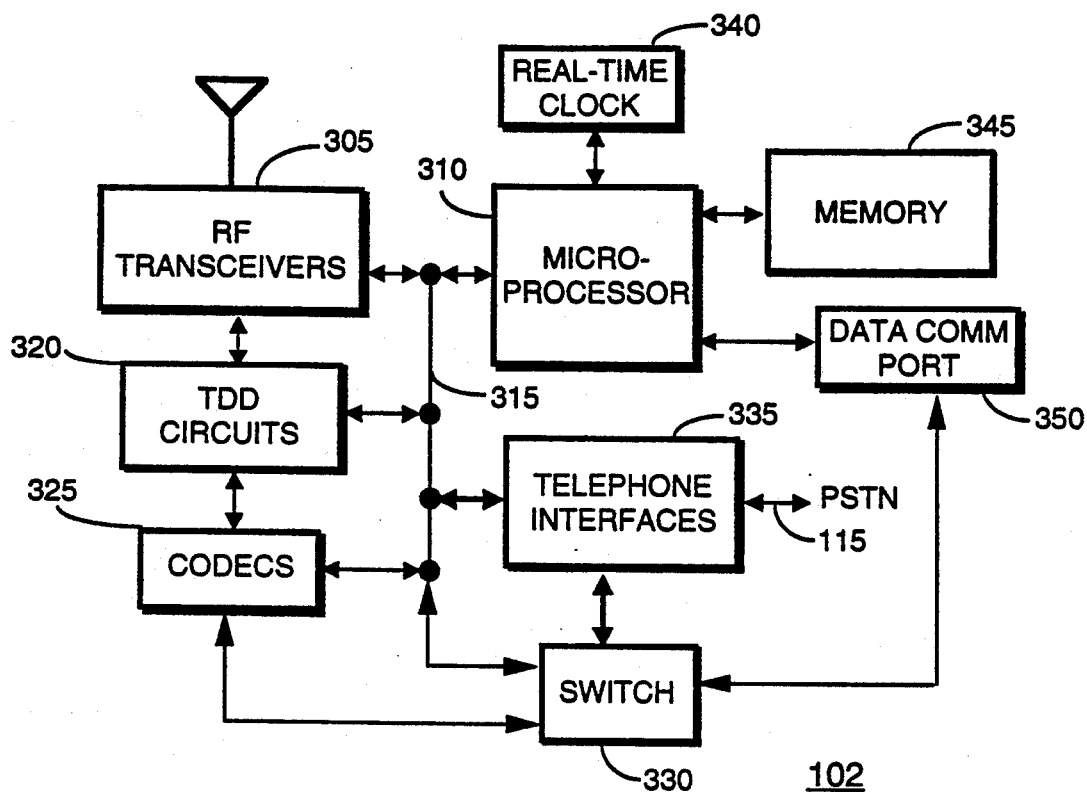
FIG. 3 is a block diagram of a base station used with the wireless communication system of FIG. 1 in accordance with the preferred embodiment of the present invention.

Referring next to FIG. 3, a block diagram illustrates a base station 102 in accordance with the preferred embodiment of the present invention. The base station 102 comprises a plurality of RF transceivers 305 for transmitting and receiving radio signals comprising digital information, which may include registration information. The plurality of RF transceivers 305 are coupled to and controlled by a microprocessor 310 via a bus 315. The plurality of RF transceivers 305 are further coupled to a plurality of time division duplex (TDD) circuits 320 for interfacing the plurality of RF transceivers 305 to a plurality of codecs 325 which perform audio-to-digital and digital-to-audio conversions of signals transmitted and received, respectively, by the base station 102. The plurality of codecs 325 are coupled by a switch 330 to a plurality of telephone interfaces 335, which couple a portion of the plurality of telephone lines 115 (FIG. 1) to voice communications signals from the codecs 325. The plurality of TDD circuits 320, the plurality of codecs 325, the plurality of telephone interfaces 335, and the switch 330 are further coupled to the bus 315, by which they are controlled by the microprocessor 310.

The microprocessor 310 is also coupled to a real time clock 340, which provides real time values for timing operations within the base station 102, and a memory 345, which stores program control software. When a radio signal is received that includes registration information from a PCU 120 (FIG. 1), the microprocessor 310 recovers the type value 247 from the radio signal and consults the memory 345 to determine the PCU type. Unlike a microprocessor in a conventional base station, the microprocessor 310 may, after determining that the PCU is of a specific type, such as a rental PCU, immediately transfer the registration information to a data communication port 350 for subsequent transmission to the network control center 130 (FIG. 1), which performs a call authorization process. At completion of an authorized call, the microprocessor 310 may further forward call information to the data communication port 350 for subsequent transmission to the network control center 130 (FIG. 1). The data communication port 350 is coupled between the microprocessor 310 and the switch 330, which is employed to couple the data communication port 350 to the plurality of telephone interfaces 335, thereby providing for communication through the PSTN 110 (FIG. 1) by at least one of the plurality of telephone lines 115. In this manner, the base station 102 may communicate with the network control center 130 (FIG. 1) to authorize calls initiated by rental PCUs 120 and to transmit call information when the calls are terminated. As will be apparent to one skilled in the art, it is possible in certain telephone systems to carry both the data from the data communication port 350 and the voice communications signals on the same telephone lines 115.

Figure 4:
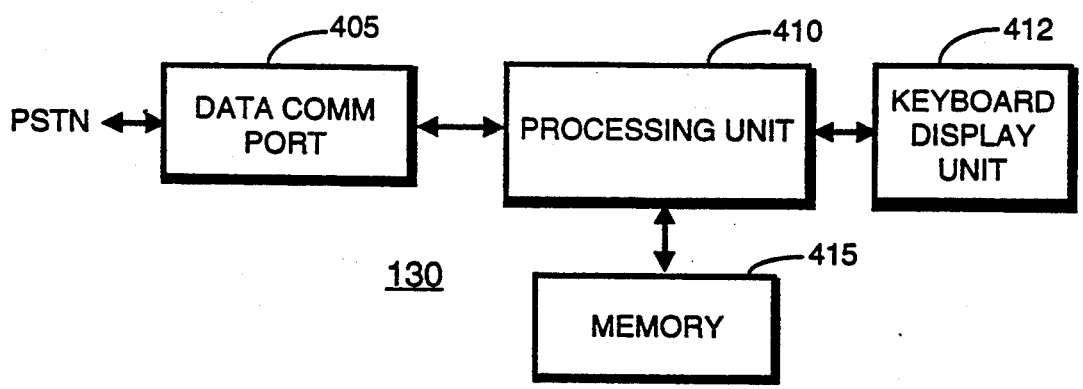
FIG. 4 is a block diagram of a network control center for controlling the wireless communication system of FIG. 1 in accordance with the preferred embodiment of the present invention.

The network control center 130 in accordance with the preferred embodiment of the present invention is depicted in the block diagram of FIG. 4. The network control center 130 comprises at least one data communication port 405 for transmission and reception of data communication signals over the PSTN 110 (FIG. 1). These signals are generated and received by a processing unit 410 coupled to the at least one data communication port 405. According to the present invention, information about PCUs is entered via a keyboard display unit 412. The PCU information is then received by the processing unit 410 and stored in a memory 415. The processing unit 410, in response to reception of registration information from a base station 102 (FIG. 1), retrieves information about a corresponding PCU 120 from the memory 415 to determine whether authorization for a call is to be granted. Additionally, the processing unit 410 receives call information via the at least one data communication port 405 when the call is terminated, in response to which the processing unit 410 updates billing information for the corresponding PCU 120. The updated billing information is forwarded, also through the PSTN 110 (FIG. 1) by the at least one data communication port 405, when the processing unit 410 receives a billing request from the PCU supplier 135 (FIG. 1).

In accordance with the preferred embodiment of the present invention, the network control center processing unit 410 receives registration information in response to the base station 102 determining that the calling PCU is of a designated type, such as a rental PCU. The processing unit 410 may, for example, only authorize calls from a particular rental PCU if the total amount of the charges for the PCU do not exceed a predetermined amount. Alternatively, calls may be authorized with respect to time. The user of a rental PCU, for example, may be able to make calls only for an agreed-upon time period, after which the PCU must be returned to the PCU supplier 135 (FIG. 1). In this manner, calls from rental PCUs may be authorized and billed in real time, whereas calls from other types of PCUs, such as those assigned to full-time users, may continue to be processed conventionally.

Figure 5:
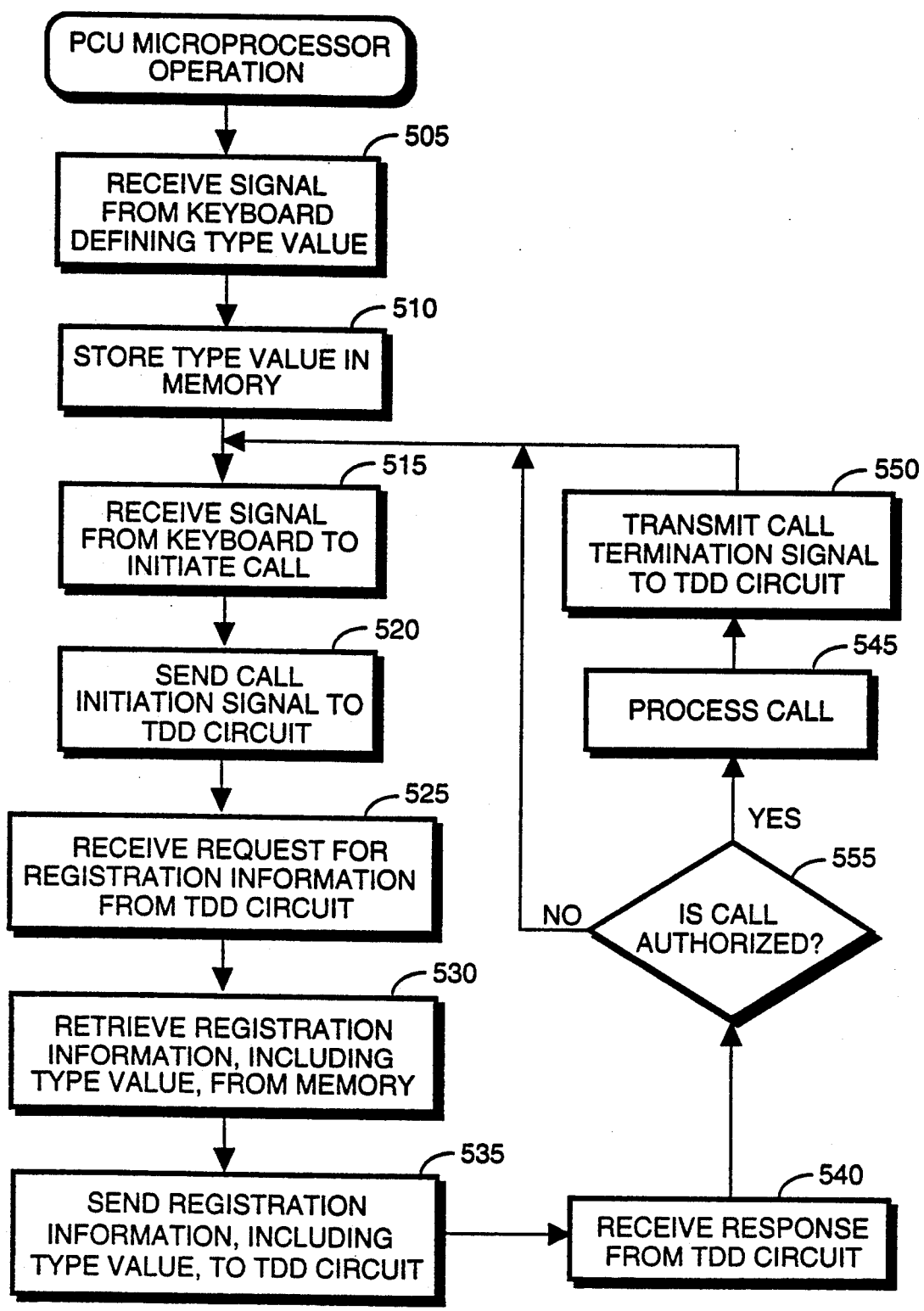
FIG. 5 is a flowchart of the operation of the PCU microprocessor of FIG. 2 in accordance with the preferred embodiment of the present invention.

Referring to FIG. 5, a flowchart illustrates the operation of the PCU microprocessor 210 of FIG. 2. Initially, in accordance with the preferred embodiment of the present invention, the PCU 120 (FIG. 2) is programmed when the microprocessor 210 receives 505 registration data, including a type value, which is subsequently stored 510 in the memory 245, preferably from the keyboard 240. This type value preferably indicates that calls made by the PCU 120 are to be authorized or billed in a manner different than those made by conventional PCUs, as may be the case if the PCU 120 is programmed with a type value indicating that the PCU 120 is a rental PCU. As described above, programming of the PCU 120 is only allowed when the correct PCU identification number accompanies the programmed information.

A call from the PCU 120 is initiated when the microprocessor 210 (FIG. 2) receives 515 a user-initiated signal, such as a destination telephone number, from the keyboard 240. In response to reception of the user-initiated signal, the microprocessor 210 transmits 520 a call initiation signal to the TDD circuit 220. The call initiation signal is intended for reception by a base station 102 (FIG. 1) as will be described below. The microprocessor 210 subsequently receives 525 a request for registration information, preferably including the type value, in response to which the registration information is retrieved 530 from the memory 245 (FIG. 2). The registration information, including the type value, is provided 535 to the TDD circuit 220 for transmission to the base station 102 (FIG. 1). As described below, the base station 102 thereafter transmits an appropriate authorization signal to the PCU 120. In response to receiving 540 authorization from the TDD circuit 220, the microprocessor 210 processes 545 the call in a manner well known to one skilled in the art. Once the call is completed, the microprocessor 210 transfers 550 a call termination signal to the TDD circuit 220 for subsequent transmission to the base station 102. If the call is not authorized 555, the microprocessor 210 (FIG. 2) continues to wait for further signals from the keyboard 240.

Figure 6:
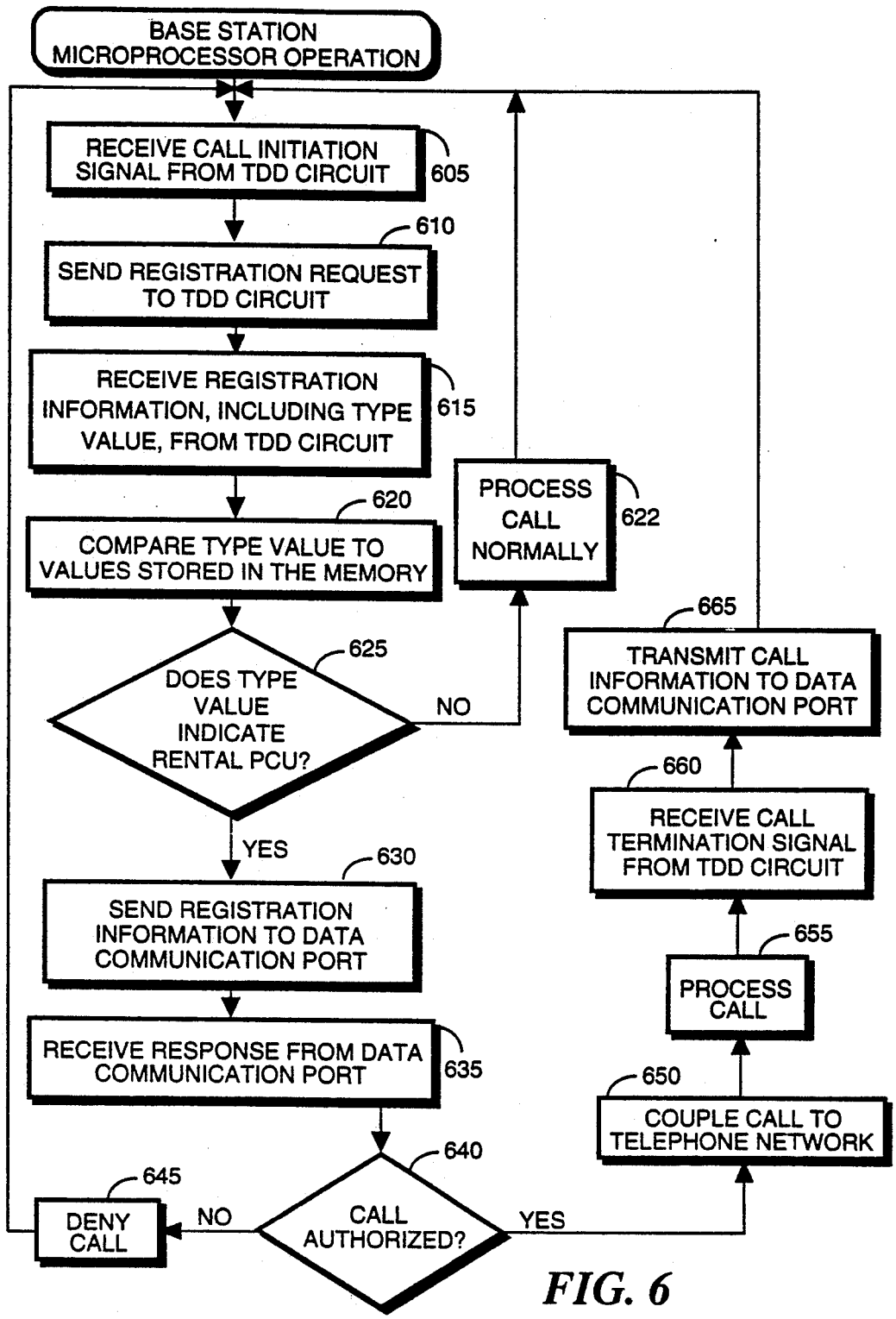
FIG. 6 is a flowchart of the operation of the base station microprocessor of FIG. 3 in accordance with the preferred embodiment of the present invention.

Referring next to FIG. 6, a flowchart depicts the operation of the base station microprocessor 310 (FIG. 3) in accordance with the preferred embodiment of the present invention. A call is initiated when the microprocessor 310 receives 605 a call initiation signal, originated in a PCU 120 (FIG. 1), from a TDD circuit 320. In response to reception of the call initiation signal, the microprocessor 310 provides 610 a registration request signal to the TDD circuit 320 (FIG. 3). The registration request signal is intended for reception by the PCU 120, as described in FIG. 5. In response to receiving 615 the registration information, including the type value, the microprocessor 310 compares 620 the received type value to values stored in the memory 345 (FIG. 3) to determine the PCU type. This type value may, for example, indicate that calls from the PCU are to be authorized and billed immediately, as would be the case for a rental PCU.

In accordance with the preferred embodiment of the present invention, if the type value indicates 625 a designated type of PCU, such as a rental PCU, the microprocessor 310 forwards 630 the registration information to the data communication port 350 (FIG. 3). The registration information is preferably transmitted over the PSTN 110 (FIG. 1) for subsequent reception by the network control center 130, as will be described below. The microprocessor 310 thereafter receives 635 a response from the network control center 130 via the data communication port 350. The response may indicate that the call is not authorized 640 by the network control center 130 (FIG. 1), in which case the call is denied 645. If the call from the PCU 120 (FIG. 1) is authorized 640, the call is coupled 650 to the PSTN 110 and further processed 655, in a manner well known to one skilled in the art, by the microprocessor 310. When the microprocessor 310 (FIG. 3) receives 660 a call termination signal from a rental PCU, call information, such as call destination and time of the call, is transferred 665 to the data communication port 350 for subsequent transmission to the network control center 130 (FIG. 1).

Figure 7:
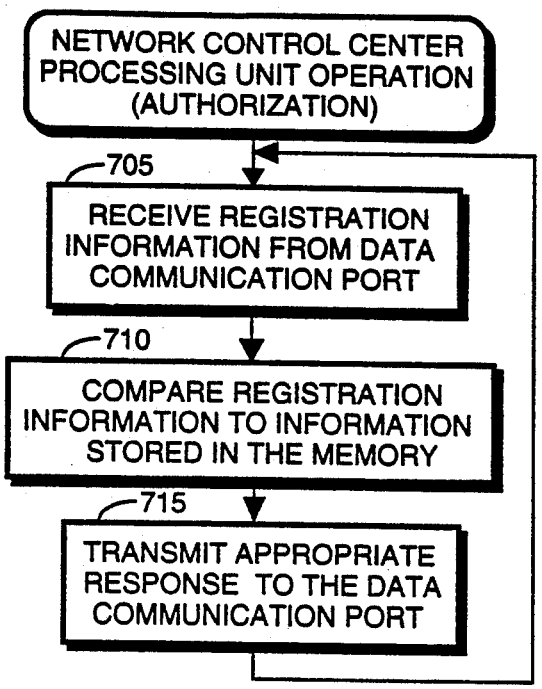
FIG. 7 is a flowchart of the operation of the network control center processing unit of FIG. 4 during an authorization process in accordance with the preferred embodiment of the present invention.

The operation of the network control center processing unit 410 (FIG. 4) during the call authorization process is illustrated by the flowchart of FIG. 7. As described in FIG. 6, when a designated type of PCU, such as a rental PCU, initiates a call, authorization of the call is performed by the network control center 130. In this case, the processing unit 410 receives 705 the registration information, which is transmitted over the PSTN 110 (FIG. 1), from a data communication port 405. The processing unit 410 thereafter compares 710 the received registration information to stored information corresponding to the calling PCU 120 (FIG. 1). In this manner, the network control center 130 is able to verify that the PCU 120 is authorized for use at the time of the call. The processing unit 410 (FIG. 4) subsequently transfers 715 an appropriate response, indicating whether the call is authorized or denied, to the data communication port 405. The response is transmitted over the PSTN 110 (FIG. 1) and received by the base station 102 as described in FIG. 6. The network control center processing unit 410 may, in accordance with the preferred embodiment of the present invention, authorize many different calls simultaneously. Additionally, other processes, described below, may occur during the authorization process.

Figure 8:
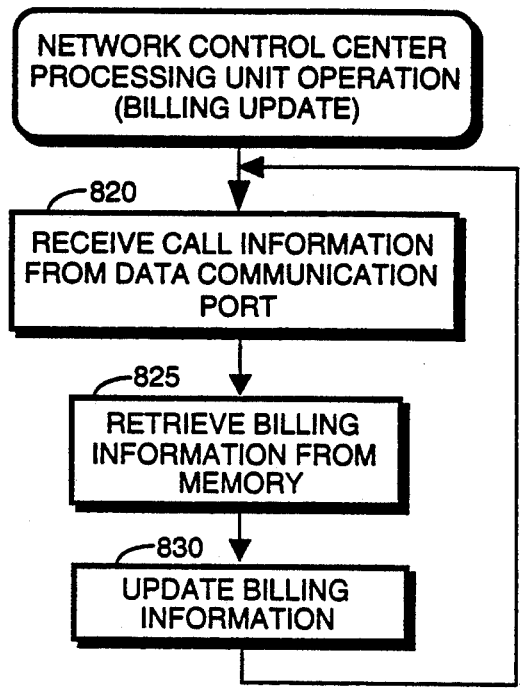
FIG. 8 is a flowchart of the operation of the network control center processing unit of FIG. 4 during a billing update process in accordance with the preferred embodiment of the present invention.

When a call by a rental PCU has been completed, the network control center processing unit 410 (FIG. 4) updates billing information for the PCU, as shown in the flowchart of FIG. 8. The initial step in this process is the reception 820 of call information, such as call destination or time of the call, by the processing unit 410. In response to reception of the call information, which originates in the base station 102 as described in FIG. 6, the processing unit 410 retrieves 825 billing information for the PCU 120 (FIG. 1) from the memory 415. The billing information is thereafter updated 830 based upon the call information. This process, in accordance with the preferred embodiment of the present invention, may occur simultaneously with other processes in the processing unit 410, thereby allowing billing information to be updated at the time of completion of every authorized call from a PCU of a specific type.

Figure 9:
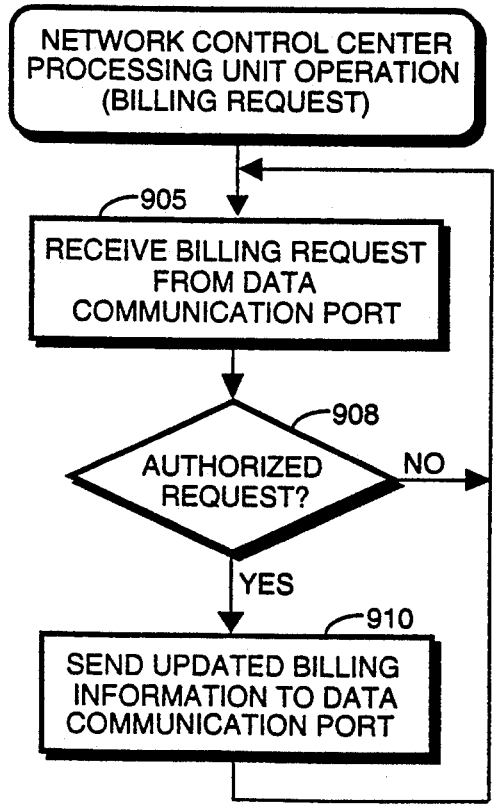
FIG. 9 is a flowchart of the operation of the network control center processing unit of FIG. 4 during a process in which billing information is provided to a PCU supplier in accordance with the preferred embodiment of the present invention.

FIG. 9 depicts a flowchart of a process in which billing information for designated PCUs, such as rental PCUs, may be provided to the PCU supplier 135 (FIG. 1). When a billing request for a rental PCU is received 905, via a data communication port 405, the processing unit 410 (FIG. 4) determines 908 whether the PCU supplier 135 is authorized to receive billing information for the selected PCU. If the PCU supplier 135 is authorized, the updated billing information is transferred 910 to the data communication port 405 for subsequent transmission, via the PSTN 110, to the PCU supplier 135. In accordance with the preferred embodiment of the present invention, the processing unit 410 (FIG. 4) may, while supplying billing information to the PCU supplier 135, be authorizing calls from PCUs, as shown in FIG. 7, and updating billing information for other PCUs, as shown in FIG. 8, thus providing for real time authorization and billing of selected PCUs.

In summary, the wireless communication system in accordance with the preferred embodiment of the present invention allows for calls to and from different types of PCUs to be authorized and billed by different methods. In this manner, calls to and from a large number of PCUs issued to full-time users may continue to be processed by conventional means, wherein the existing telephone lines are utilized only once a day to transmit billing information from the base stations to the network control center. Alternatively, calls to and from other types of PCUs, such as PCUs rented to temporary users, may be authorized by the network control center at the time of each call, thereby preventing temporary users from receiving service for which they have not previously paid. Additionally, the network control center could authorize calls from rental PCUs based on time. A temporary user who, for example, has not returned the rental PCU to the PCU supplier within an agreed-upon time could be restricted from making further calls for which the PCU supplier would be charged.

In addition to authorizing the calls from selected types of PCUs, the network control center also updates billing information for the selected types of PCUs as each call is completed. Therefore, the PCU supplier may contact the network control center at any time, rather than only once a day, to access billing information for a PCU, thus allowing the PCU supplier to present itemized bills to temporary users at the time the PCUs are returned. A situation may thereby be avoided in which a temporary user is billed for less than the total charges he has incurred.

A further feature, in accordance with the preferred embodiment of the present invention, is the utilization of the existing telephone lines to provide communication, wherein calls from PCUs may be authorized, between the base stations and the network control center. Because the number of calls from PCUs issued to full-time users would typically be very large compared to the number of calls made from other types of PCUs, the capacity of the existing PSTN telephone lines coupled to the base stations would not be overloaded during peak business hours.

By now it should be appreciated that there has been provided a method and apparatus for selectively authorizing and billing, in real time, calls in a public telepoint system.

We claim:

1. A method, in a base station providing communications within a coverage area for authorizing and processing calls initiated by portable communication units (PCUs), whereby the base station is coupled to a network control center, the method comprising:
   (a) receiving registration information from a PCU;
   (b) determining, in response to step (a), that the PCU is a first type of PCU when the registration information includes a type value and that the PCU is a second type of PCU when the registration information does not include the type value;
   (c) requesting, in response to determining that the PCU is of the first type, authorization from the network control center for a call initiated by the PCU;

(d) processing if authorization is received from the network control center, the call initiated by the PCU in response to step (c), wherein call information is automatically forwarded to the network control center in response to termination of the call; and (d1) processing, without request for authorization, the call initiated by the PCU when the PCU is the second type of PCU, wherein call information is not forwarded to the network control center in response to termination of the call.

2. The method in accordance with claim 1, wherein step (c) comprises the steps of:

(e) transmitting the registration information to the network control center; and (f) receiving an authorization signal from the network control center.

3. The method in accordance with claim 1, further comprising the steps of:

(g) receiving a call termination signal at completion of the call; and (h) providing, in response to step (g), call information to the network control center.

4. A method, in a base station providing communications within a coverage area for authorizing and processing calls initiated by portable communication units (PCUs), whereby the base station is coupled to a network control center, the method comprising:

(a) receiving registration information, including a value indicating a type of PCU, from a PCU;

(b) determining, in response to step (a), the PCU type indicated by the value;

(c) requesting, in response to determining that the PCU is of a first type, authorization from the network control center for a call initiated by the PCU;

(d) coupling, if authorization is received from the network control center, the call to the telephone system;

(e) receiving, subsequent to step (c), a call termination signal from the PCU of the first type at completion of the call;

(f) providing, in response to step (e), call information for the PCU of the first type to the network control center; and (g) processing, in response to determining that the PCU is of a second type, the call from the PCU in a conventional manner without requesting authorization, wherein call information for the PCU of the second type is not provided to the network control center in response to a call termination signal from the PCU of the second type.

5. The method in accordance with claim 4, wherein step (g) comprises the steps of:

(h) coupling, in response to determining that the PCU is of the second type, the call to the telephone system without requesting authorization from the network control center;

(i) receiving, subsequent to step (h), the call termination signal from the PCU of the second type, wherein the call information for the PCU of the second type is not provided to the network control center in response to receiving the call termination signal from the PCU of the second type.

6. A method for real-time billing of calls initiated by portable communication units (PCUs) in a wireless communication system, the wireless communication system comprising at least one base station, the at least one base station providing communications for a limited coverage area, and the at least one base station coupled to a telephone system, whereby calls from the PCUs may be transferred over the telephone system, the wireless communication system further comprising a network control center for authorizing the calls from the PCUs and processing customer billing, wherein billing information may be further provided to an external electronic device, the method comprising the steps of:

(a) programming a PCU with a value, the value indicating one of at least two PCU types;

(b) the PCU transmitting data, including the value, to a base station during initiation of a call;

(c) the base station determining, in response to step (b), the PCU type;

(c1) the base station coupling the call from the PCU to the telephone system without obtaining authorization from the network control center in response to determining that the PCU is not of a first type, wherein call information is not provided to the network control center in response to termination of the call when the PCU is not of the first type;

(d) the base station obtaining, in response to the base station determining that the PCU is of the first type, authorization from the network control center for the call initiated by the PCU, wherein the authorization is obtained via the telephone system;

(e) the base station coupling, in response to step (d), the call to the telephone system;

(f) the PCU, subsequent to step (e), transmitting a call termination signal to the base station;

(g) the base station providing, in response to step (f), call information to the network control center via the telephone system;

(h) the network control center updating billing information in response to reception of the call information;

(i) the network control center receiving a billing request from the external electronic device; and (j) the network control enter providing, in response to step (i), the updated billing information to the external electronic device.

7. A base station for providing communications for a limited coverage area, comprising:

a transceiver for transmitting radio frequency (RF) signals to an external portable communication unit (PCU) and for receiving RF signals from the PCU, the received RF signals comprising a value indicating a PCU type;

determination circuitry coupled to the transceiver for determining that the PCU is of a first type or of a second type responsive to the received RF signals;

communication means coupled to the determination circuitry and the transceiver for communicating with an external network control center at least once per call, to authorize the call prior to processing the call, in response to the determination circuitry determining that the calling PCU is of the first type; and providing means coupled to the communication means for providing call information to the external network control center in response to termination of the call when the PCU is of the first type, wherein call information is not provided to the external network control center in response to termination of the call when the PCU is of the second type.

8. The base station in accordance with claim 7, wherein the communication means comprises:
- a telephone interface for providing an authorization request to the external network control center through an external telephone system when the PCU is of the first type and for providing the call information to the external network control center through the telephone network when the PCU is of the first type.

9. The base station in accordance with claim 7, wherein the base station is coupled to the external network control center by a non-dedicated communication channel over which the base station authorizes the call and provides the call information when the PCU is of the first type.

10. The base station in accordance with claim 9, wherein the non-dedicated communication channel comprises a telephone network.

11. A wireless communication system for transporting calls across a telephone system and providing billing information to an external electronic device, comprising:
- a plurality of portable communication units (PCUs) for transmitting RF signals, the RF signals comprising data which includes a value indicating a PCU type;
- a network control center for authorizing, when necessary, calls from the PCUs;
- at least one base station for receiving the RF signals transmitted by a PCU and determining a PCU type indicated by the value included in the data, wherein the at least one base station processes a call from the PCU in a conventional manner without providing call information about the call to the network control center in response to termination of the call when the PCU is of a first type, and wherein the at least one base station provides information about the call to the network control center in response to termination of each call from the PCU when the PCU is of a second type; and
- a communication channel coupled between the at least one base station and the network control center, wherein the communication channel is activated at least once per call to provide the call information to the network control center when the at least one base station determines that a calling PCU is of the second type.

12. The wireless communication system in accordance with claim 11 wherein the at least one base station comprises:
- a transceiver for transmitting RF signals to a PCU and for receiving the RF signals transmitted by the PCU;
- a memory coupled to the transceiver for storing information, including the value indicating the PCU type;
- determination circuitry coupled to the memory for determining the PCU type indicated by the value; and
- a telephone interface coupled to the transceiver for transporting calls to and from the PCU.

13. The wireless communication system in accordance with claim 11, wherein the network control center comprises:
- computing means for computing the billing information;
- a memory coupled to the computing means for storing the billing information; and
- a data interface coupled to the memory and the computing means for receiving the billing request and transmitting the billing information to the external electronic device in response thereto.

14. The wireless communication system in accordance with claim 11, wherein the plurality of PCUs comprises:
- a transceiver for transmitting and receiving radio frequency (RF) signals, wherein the transmitted RF signals comprise the data which includes values indicating the PCU type;
- a processing unit coupled to the transceiver for processing the received RF signals;
- programming means coupled to the processing unit for receiving information, wherein the received information comprises at least the value indicating the PCU type; and
- a memory coupled to the processing unit and the programming means for storing data included in the received RF signals and for storing the received information, including the values indicating the PCU types.

15. The wireless communication system in accordance with claim 14, wherein the programming means comprises:
- a data entry device coupled to the processing unit whereby user-executed commands may be entered; and
- an audio interface coupled to the processing unit for receiving audio information from a user and for transmitting audio information to the user.

16. The wireless communication system in accordance with claim 11, wherein the communication channel over which authorization is obtained by the at least one base station and over which the call information is provided comprises a non-dedicated wireline.

17. The wireless communication system in accordance with claim 11, wherein the communication channel comprises a telephone network.

18. A method, in a base station providing communications within a coverage area for processing calls initiated by portable communication units (PCUs), whereby the base station is coupled to a network control center, the method comprising the steps of:
(a) receiving information from PCUs of first and second types;
(b) determining whether any of the information includes a type value indicative of the first type of PCU;
(c) processing calls from the PCUs by coupling the calls to a telephone system, wherein, in response to determining that calling PCUs are of the first type, call information about each call is provided to the network control center over the telephone system in response to termination of each call, and wherein, in response to determining that calling PCUs are of the second type, call information about each call is not provided to the network control center in response to termination of each call.

* * * * *